United States Patent [19]

Eisele et al.

[11] 4,021,413

[45] May 3, 1977

[54] PRODUCTION OF WOOD GLUE

[75] Inventors: Wolfgang Eisele, Ludwigshafen; Harro Petersen, Frankenthal; Johann Mayer, Ludwigshafen; Otto Wittmann, Frankenthal, all of Germany

[73] Assignee: BASF Aktiengesellschaft, Ludwigshafen, Germany

[22] Filed: July 2, 1974

[21] Appl. No.: 485,063

[30] Foreign Application Priority Data

July 6, 1973 Germany .......................... 2334380

[52] U.S. Cl. .............................................. 260/69 R
[51] Int. Cl.$^2$ ...................................... C08G 12/12
[58] Field of Search ...................................... 260/69

[56] References Cited

UNITED STATES PATENTS 3,450,659  6/1969  Bondi et al. ......................... 260/69

FOREIGN PATENTS OR APPLICATIONS 1,168,882  4/1964  Germany ............................. 260/69

Primary Examiner—J. Ziegler
Attorney, Agent, or Firm—Johnston, Keil, Thompson & Shurtleff

[57] ABSTRACT

Condensates containing urea and formaldehyde in a molar ratio of from 1:2.5 to 1:4.5 are converted into wood glue by allowing the viscosity to increase at a pH of from 1 to 3 and at only slightly elevated temperature and then adding urea at a pH of 7 to 9.

4 Claims, 2 Drawing Figures

PRODUCTION OF WOOD GLUE

This application discloses and claims subject matter described in German patent application No. P 23 34 380.8 filed July 6, 1973 which is incorporated herein by reference.

It is known that wood glues can be prepared from condensates of urea and formaldehyde.

The starting materials may be not only urea and formaldehyde but also aqueous precondensates of urea and formaldehyde having a high proportion of formaldehyde which are often obtained instead of aqueous formaldehyde in synthesis plant and which have certain advantages in the storage of aqueous formaldehyde and its processing.

The production of such precondensates having a high content of formaldehyde is disclosed inter alia in German Pat. Nos. 1,168,182 and 1,239,290 and in German Laid-Open Specification (DOS) No. 1,645,016.

In the lastmentioned specification an acid treatment of certain of the said precondensates with high formaldehyde content is recommended in order to improve the properties of wood glues prepared with these precondensates. Reference is made to the fact that precondensates prepared by an alkaline method are not particularly suitable for the production of wood glues because of their structure and therefore a rearrangement of such precondensates into suitable products is desirable. Treatment of the precondensates in a strongly acid medium is recommended as a suitable means of achieving this rearrangement. The statement in the said Laid-Open Specification that the treatment may be carried out at from room temperature to 100° C is used merely in the sense that the precondensate is heated during the acid treatment at from 50° to 100° C.

Figure 2:
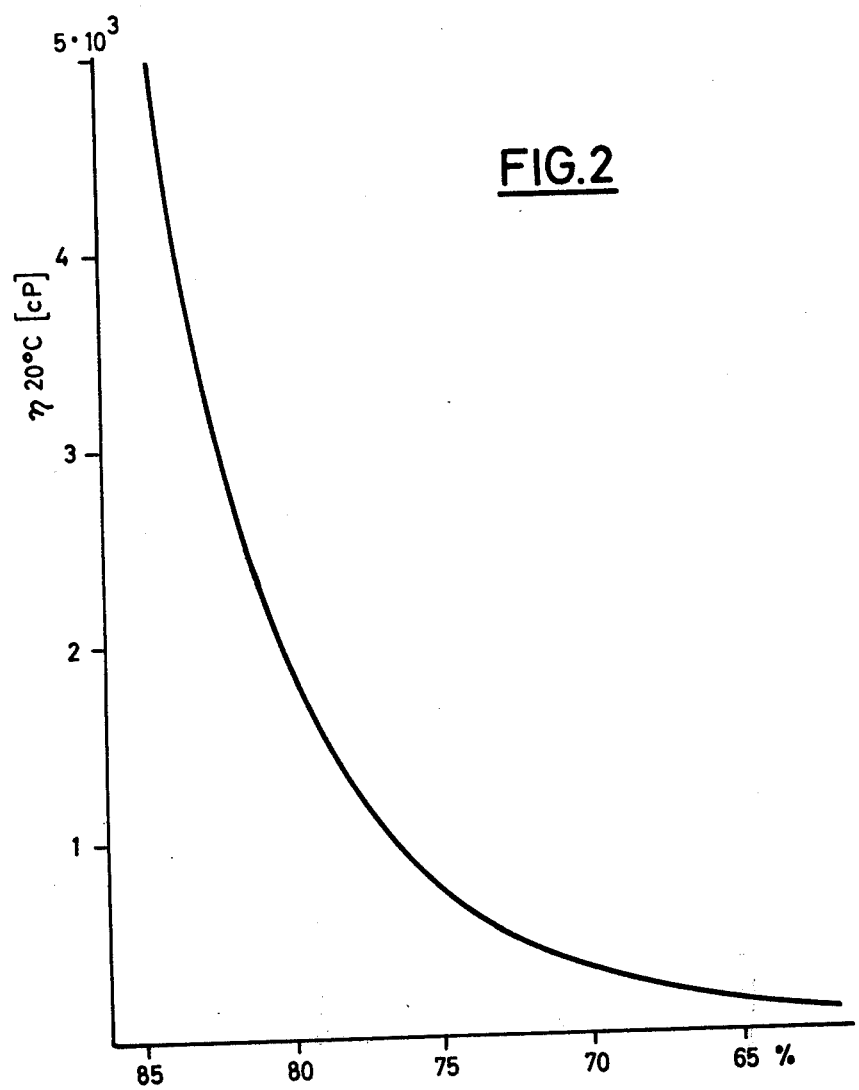

We have now found that a wood glue having improved properties is obtained in a surprising manner by acid treatment of an aqueous precondensate from formaldehyde and urea having a formaldehyde content of at least 2.5 moles per mole of urea followed by addition of urea up to a formaldehyde content of less than 2, when a precondensate which has a formaldehyde content of from 45 to 55% (based on the weight of the solution) and a molar ratio of formaldehyde to urea of from 2.5:1 to 4.5:1 is left at a pH of from 1 to 3 and a temperature of from room temperature (i.e. about 20° C) to 40° C until the solution has a viscosity at least corresponding to 5000 centipoises/20° C in an 85% solution, then the pH is adjusted to 7 to 9 and urea is added until a molar ratio of urea to formaldehyde of from 1:1.2 to 1:2 has been achieved. The term "85% solution" refers to the mathematical sum of urea and formaldehyde with relation to the weight of the solution. The appropriate minimum viscosity $\eta$ for other solutions may be determined by plotting a series of concentrations as shown in FIG. 2.

The difference between this and the invention disclosed in German Laid-Open Specification (DOS) No. 1,645,016 therefore consists in the fact that it is not necessary either to heat or to bring the precondensate into reaction with urea under the conventional reaction conditions. There is also no increase in viscosity in the process described.

Rather, essentially three mixing processes are sufficient to carry out the invention: mixing a suitable amount of acid in, then a suitable amount of base and finally (the time between the above being unimportant) a suitable amount of urea.

Criteria for the term "suitable" may be seen in the pH and/or the molar ratio. The pH is adjusted by adding acid to from 1 to 3 and particularly from 1.5 to 2.5, the rise in viscosity is awaited, the whole is then neutralized to pH from 7 to 9 and urea is added up to a molar ratio of from about 1:1.2 to 1:1.2.0 which is the usual molar ratio for resin glues.

Figure 1:
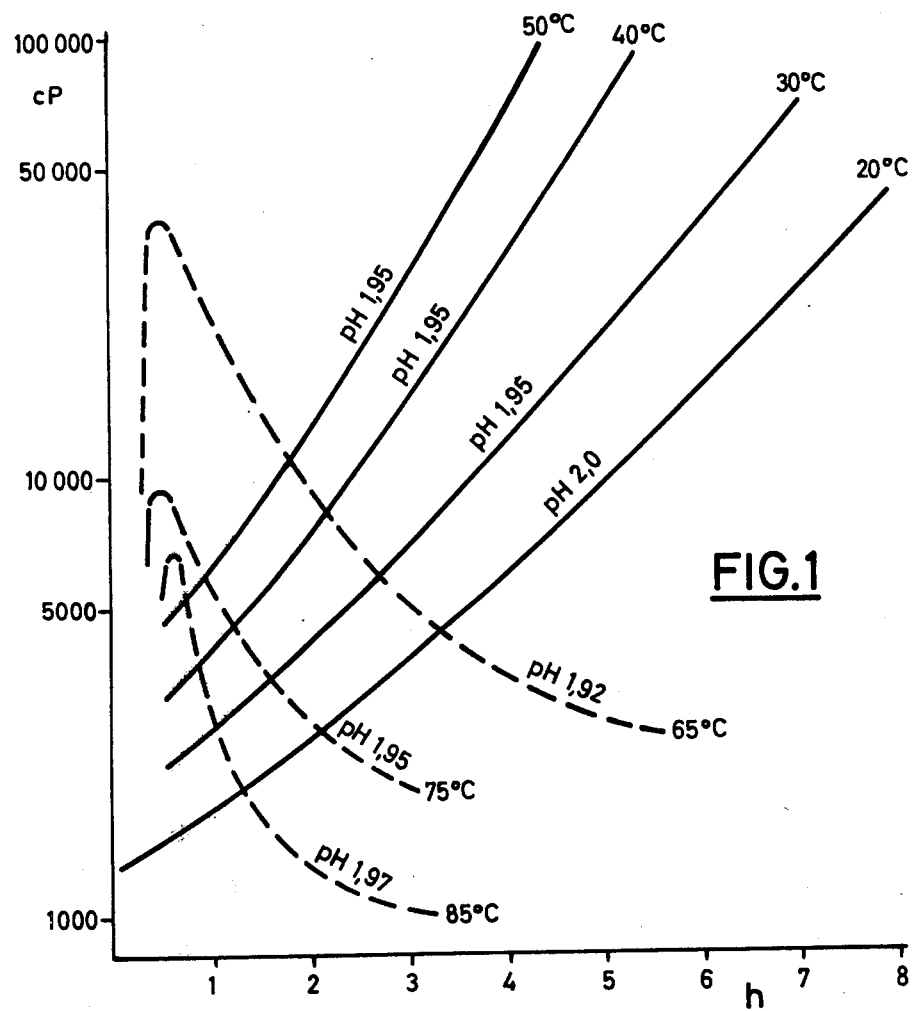

It will be seen from the accompanying FIG. 1 that whether the acidified precondensate is heated or not makes a fundamental difference; at a pH of about 2.0 (measured at 20° C; trivial changes occur at other temperatures because of the interrelation between temperature and hydrogen ion activity) a more or less rapid increase in viscosity takes place at below 50° C; above about 50° to 60° C however the initial increase in viscosity is evidently accompanied by a rearrangement reaction which involves molecular degradation and in all cases finally gains the ascendancy. The glue properties of such degraded precondensates are thus lost for the time being and are not restored until the aftercondensation with urea.

According to the invention high viscosity condensates having a high content of formaldehyde are obtained which can be brought to the usual content of formaldehyde by admixing urea. Apart from the lower consumption of energy this requires less apparatus. Since resin glues are diluted in any case when used, the addition of urea may be combined with this dilution.

Because of the simplicity of the process of the invention only a few postulations need to be mentioned:

Suitable precondensates having a high content of formaldehyde for the purposes of the invention are for example alkaline condensed precondensates such as are described in Austrian Pat. No. 214,452 or in German Published Application (DAS) No. 1,239,290 or the acid condensed precondensates for example according to German Pat. No. 1,168,882.

The precondensates generally have a molar ratio of formaldehyde to urea of at least 2.5:1 and preferably of from 3.5:1 to 4:1; condensates containing even more formaldehyde may be used in principle; addition of urea up to a molar ratio of 4.5 or less is then necessary of course prior to acidification.

Acid condensed precondensates for example according to the abovementioned patent are particularly preferred as starting products for the above described process according to the invention.

Mineral acids or strong organic acids such as sulfuric, hydrochloric, phosphoric, toluenesulfonic or formic acid are generally used to adjust the necessary pH of from 1 to 3 and preferably of from 1.5 to 2.5. Sulfuric acid is preferred.

After acidification there occurs a rise in viscosity which is arrested by neutralization when the solution, which may have a condensate content of from 40 to 70% and particularly from 50 to 60%, has a viscosity of from 5000 to, say, 150,000 centipoises. A higher viscosity is generally preferred; it is limited however by the facilities available for handling viscous solutions and also by the conversion which finally takes place from the sol to the gel phase, i.e. a phase in which the molecular weight of the condensate has increased out of all proportion.

The temperature during the acid treatment is generally room temperature, i.e. from about 10° to 30° C, but it may be raised somewhat for example up to about 40° C, if it is desired to accelerate the increase in viscosity (cf. FIG. 1) and to facilitate the subsequent solution of the added urea. The following remarks will further explain FIG. 1: even in the viscosity/time curves obtained at higher temperature there is observed an increase in viscosity, at least temporarily; this increase is however caused by the inevitable period of time during which the condensate solution is within the temperature range below 40° C in accordance with the invention; if acid is added to a solution of precondensate which has already been preheated until the desired degree of acid is obtained, such a rise in viscosity is not observed.

Neutralization is carried out with a strong inorganic alkali such as NaOH or $Ca(OH)_2$ or in certain cases with $Na_2CO_3$ or $CaCO_3$, or with organic amine bases, polyamines (polyalkylenepolyamines) and the like. The lastmentioned bases have proved to have some advantages and are useful in inexpensive residue grades.

The following Examples illustrate the invention. The reference to amounts and ratios are generally by weight.

EXAMPLE 1

1000 parts of a precondensate obtained by acid condensation (molecular ratio urea:formaldehyde = 1:3.9; viscosity 500 centipoises; content of formaldehyde 54%) is adjusted to pH 2.0 with sulfuric acid. After standing for two hours at 21° C the viscosity has risen to 21,600 centipoises/20° C. The pH is brought to 7.5 with caustic soda solution. Then 510 parts of urea and 230 parts of water are added and stirred in. After the urea has dissolved the solution has a viscosity of 315 centipoises (20° C) with a solids content of 65.8%. It is ready for use as a wood glue.

EXAMPLE 2

1000 parts of precondensate is treated as described above at pH 2. The pH of the solution is then brought to pH 7.5 with a polyalkylene polyamine available commercially as "Polyamine 1000". Then 510 parts of urea and 230 parts of water are stirred in. After the urea has dissolved the binder is ready for use. It has a viscosity of 324 centipoises at 20° C and has a solids content of 65.9%.

EXAMPLE 3

1000 parts of a precondensate as described above is adjusted to pH 2.0 with $H_2SO_4$. After having been for three hours at 22° C the solution is adjusted to pH 7.5 with the abovementioned polyamine. 540 parts of ureas are dissolved therein and the whole is diluted with 230 parts of water. A binder is formed which has a viscosity of 460 centipoises at a solids content of 66.1%.

PRODUCTION OF CHIPBOARDS

The products according to Examples 1 to 3 are diluted with water to a solids content of 50% and 1% of ammonium chloride is added as a hardener.

4 kg lots of absolutely dry chips are sprayed with 560 g of the binder solution, formed into a mat and pressed at 165° C for 4 minutes in a heated press to form a chipboard. The thickness of board achieved is 18 mm and the specific gravity is 0.6.

The boards are tested according to DIN 52360–52365 (cf. the following Tables). Columns 1, 2 and 3 are the binders of Examples 1, 2 and 3 and column CUR is a conventional urea resin.

| Properties of the binders: | 1 | 2 | 3 | CUR |
|---|---|---|---|---|
| solids content in % | 65.8 | 65.9 | 66.1 | 66.5 |
| viscosity at 20° C in cp | 315 | 342 | 460 | 449 |
| molecular ratio: urea:formaldehyde | 1:1.4 | 1:1.4 | 1:1.35 | 1:1.4 |
| reaction period 30° C (hours) | 6.5 | 6.75 | 10 | 6 |
| 1.5% $NH_4Cl$: 100° C (seconds) | 25 | 25 | 28 | 32 |
| Test results on the chipboards (DIN 52360–657) | | | | |
| specific gravity kg:$m^3$ | 601 | 615 | 612 | 600 |
| thickness in mm | 18.2 | 18.4 | 18.1 | 18.2 |
| transverse tensile strength in kg/$cm^2$ | 7.3 | 8.4 | 8.1 | 6.7 |
| flexural strength in kg/$cm^2$ | 240 | 258 | 257 | 231 |
| Swelling in thickness in % | 15.2 | 17.4 | 14.9 | 18.2 |
| after 2 hours ($H_2O/20°$ C) | | | | |
| after 24 hours ($H_2O/20°$ C) | 19.2 | 21.0 | 19.6 | 22.8 |

We claim:

1. A process for the production of a wood glue by acid treatment of an aqueous precondensate of formaldehyde and urea having a formaldehyde content of at least 2.5 moles per mole of urea followed by addition of urea up to a formaldehyde content of less than 2 moles per mole of urea, wherein the precondensate which has a condensate content of from 40 to 70% based on the weight of the solution, and a molar ratio of formaldehyde to urea of from 2.5:1 to 4.5:1 is acidified to a pH of from 1 to 3 and allowed to stand at a temperature of from ambient temperature to 40° C until the solution has a viscosity of 5,000 to 150,000 centipoises/20° C, the pH is then adjusted to from 7 to 9 and urea is added until a molar ratio of urea:formaldehyde of 1:1.2 to 1:2 has been reached.

2. A process as set forth in claim 1 wherein the precondensate is allowed to stand at pH from 1.5 to 2.5.

3. A process as set forth in claim 1 wherein the precondensate has a molar ratio of formaldehyde:urea of from 3.5:1 to 4:1.

4. A process as set forth in claim 1, wherein the precondensate has a formaldehyde content of from 45 to 55%.

* * * * *